April 7, 1959 I. D. COLSON 2,881,370

MANUFACTURE OF SEMICONDUCTOR DEVICES

Filed March 19, 1958

INVENTOR
IAN DOUGLAS COLSON

BY
[signature], [signature]
ATTORNEYS

United States Patent Office 2,881,370
Patented Apr. 7, 1959

2,881,370

MANUFACTURE OF SEMICONDUCTOR DEVICES

Ian Douglas Colson, Whitstable, England, assignor to The General Electric Company Limited, London, England Application March 19, 1958, Serial No. 722,581
Claims priority, application Great Britain March 22, 1957
16 Claims. (Cl. 317—234)

This invention relates to semiconductor devices.

It is a common practice, in relation to semiconductor devices of the kind in which the electrode assembly of the device is enclosed in an envelope, to maintain part of the envelope in thermal contact with a metallic member so that, in operation, the device is cooled by virtue of heat being conducted away from the envelope via the said metallic member; hereafter in this specification, such a metallic member will be referred to as a cooling member.

It is an object of the present invention to provide a semiconductor device of the kind specified in which simple means are provided for maintaining the envelope in good thermal contact with a cooling member.

According to the invention, there is provided a semiconductor device in which the electrode assembly of the device is enclosed in a metallic envelope, the device being associated with a metallic clamp having a first part adapted to be secured to a cooling member so that part of the envelope is in thermal contact with the cooling member, and with a member of electrically insulating resilient material which is trapped between part of the envelope and a second part of the clamp in such a manner that the envelope is held by, and electrically insulated from, the clamp.

According to one aspect of the invention, there is provided in combination a semiconductor device in which the electrode assembly of the device is enclosed in an envelope, a clamp, a member of electrically insulating resilient material and a cooling member, a first part of the clamp being secured to the cooling member, and the member of resilient material being trapped and compressed between a part of the envelope and a second part of the clamp, the arrangement being such that the envelope is pressed against the cooling member by virtue of the pressure exerted by the compressed material on the flange.

Two arrangements in accordance with the invention will now be described by way of example with reference to the accompanying drawings, in which.

Figures 1, 2, 3, 4:
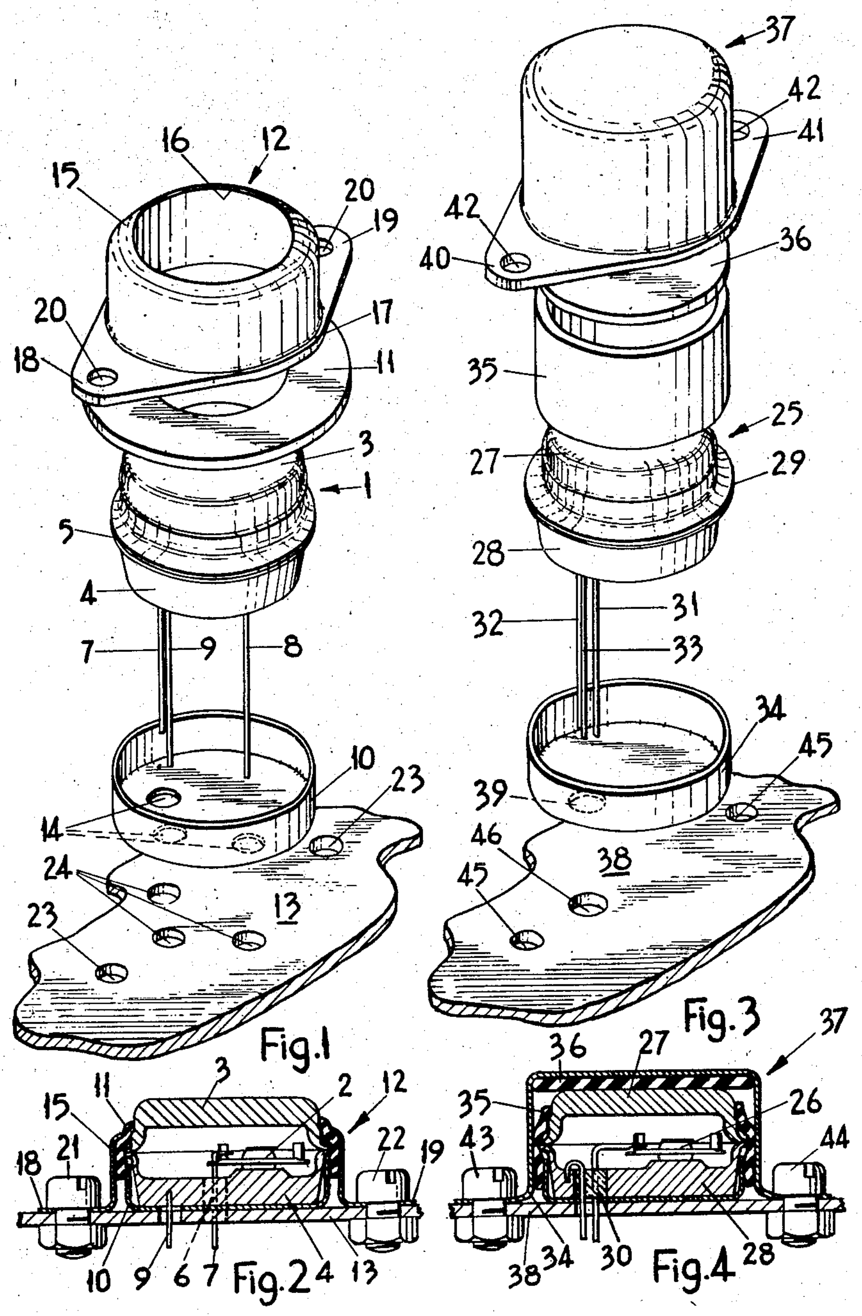
Figure 1 is an exploded perspective view of a first type of germanium P–N–P junction transistor, a cooling member, and means for clamping the transistor to the cooling member.
Figure 2 is a central sectional side elevation of the arrangement shown in Figure 1 when assembled.
Figure 3 is an exploded perspective view of a second type of germanium P–N–P junction transistor, a cooling member, and means for clamping the transistor to the cooling member.
Figure 4 is a central sectional side elevation of the arrangement shown in Figure 3 when assembled.

Considering now the first arrangement with reference to Figures 1 and 2 of the drawings, the transistor has a copper envelope generally designated 1 in which is mounted the electrode assembly 2 of the transistor. The envelope 1 consists of two parts 3 and 4 the outer surfaces of which are similar in shape, each part 3 or 4 being in the form of a circular cylindrical cup, of diamere 19 millimetres, which has a flat base and which has formed around its mouth a flange forming part of a circumferential flange 5 formed on the outer surface of the envelope 1; the flange 5 projects for a distance of 1 millimetre beyond the outer curved surface of the envelope 1. Two glass beads 6 are sealed through the base of the part 4, and two copper wires 7 and 8 are respectively sealed through the glass beads 6; the glass used for the beads preferably has a composition in accordance with United States patent application Serial No. 658,531 for Glass Compositions and Glass-to-Metal Seals filed October 16, 1958 by Lucy Florence Oldfield, and by Ethel Partridge and Michael John Anthony Partridge as joint administrators of John Henry Partridge, deceased, the coinventor of said Lucy Florence Oldfield, and may for example have a composition by weight of 42% silica, 20% titanium dioxide, 17% sodium oxide, 14% potassium oxide, 4% strontium oxide, and 3% barium oxide. The wires 7 and 8 are connected to the base and emitter electrodes of the transistor while the collector electrode is directly connected to the base of the part 4, a third wire 9 being soldered to the part 4 to act as a lead wire for the collector electrode.

The flanges of the two parts 3 and 4 are cold welded together so that the parts 3 and 4 are coaxial and the envelope 1 is hermetically sealed; the cold welding operation is carried out in an atmosphere of dry nitrogen so as to provide a permanent neutral gaseous filling for the envelope 1.

The envelope 1 of the transistor is associated with an electrically insulating anodised aluminium cup 10, a resilient annulus 11, a metal clamp generally designated 12, and a cooling member in the form of a metal chassis 13. The cup 10 has a flat base in which are provided three circular holes 14 which correspond in position to the wires 7, 8 and 9, and the cup 10 snugly fits over the part 4 of the envelope 1 with the wires 7, 8 and 9 respectively passing through the holes 14, with the base of the cup 10 in contact with the base of the part 4, and with the periphery of the open end of the cup 10 in contact with the side wall of the part 4. The clamp 12 is a steel pressing in the form of a circular cylinder 15 the ends of which are respectively provided with inwardly and outwardly projecting radial flanges 16 and 17; the flange 17 widens in two regions to form two lugs 18 and 19 disposed diametrically opposite each other, the lugs 18 and 19 being respectively provided with two holes 20 which are designed to accommodate the shanks of two bolts 21 and 22. The resilient annulus 11 is made of a synthetic rubber, for example a polymer of 2-chlorbutadiene having a Shore hardness of about 60, and has a thickness of 0.75 millimetre, an inner diameter of 12 millimetres and an outer diameter of 30 millimetres; the annulus 11 is fitted over the part 3 of the envelope 1 so that it covers that face of the flange 5 remote from the part 4 of the envelope 1. The clamp 12 is fitted over the envelope 1 in such a manner that the rubber annulus 11 is deformed substantially into the shape of a sleeve, part of the rubber annulus 11 being trapped between the above mentioned face of the flange 5 and the flange 16 of the clamp 12, part of the annulus 11 being trapped between the periphery of the flange 5 and the cylinder 15 of the clamp 12, and part of the annulus 11 being trapped between the outer surface of the wall of the cup 10 and the cylinder 15; the arrangement is such that the rubber annulus 11 holds the envelope 1, the cup 10, and the clamp 12 together to form one compact unit with the outer surface of the base of the cup 10 being proud of the plane containing the outer face of the flange 17 of the clamp 12 by a distance of 0.13 millimetre.

The base of the part 4 is maintained in good thermal contact with the inner face of the base of the cup 10, and the outer face of the base of the cup 10 is maintained in good thermal contact with the chassis 13, the chassis 13 being designed to conduct heat away from the transistor in operation so as to inhibit over-heating of the transistor. The chassis 13 includes three circular holes 24, which correspond in position to the wires 7, 8 and 9, and two other circular holes 23 which correspond in position to the holes 20 formed in the clamp 12.

The manner in which the envelope 1 of the transistor is clamped to the chassis 13 is as follows. The unit described above formed by the envelope 1, the cup 10, the annulus 11 and the clamp 12 is placed in position on the chassis 13 with the outer face of the base of the cup 10 in contact with the chassis 13 and with the wires 7, 8 and 9 respectively passing through the holes 24 formed in the chassis 13; it should be appreciated that the dimensions of the holes 24 are great enough to ensure that none of the wires 7, 8 and 9 contacts the periphery of the relevant hole 24. The lugs 18 and 19 are then bolted to the chassis 13 by means of the bolts 21 and 22, the shanks of the bolts 21 and 22 passing through the relevant holes 20 and 23, so that the base of the cup 10 makes over-all contact with the chassis 13, the annulus 11 being compressed between the flange 16 of the clamp 12 and the flange 5 of the envelope 1. It will thus be appreciated that the envelope 1 is pressed against the cooling member formed by the chassis 13 at least partly by virtue of the reaction of the compressed annulus 11 on the flange 5, though any resiliency of the lugs 18 and 19 may also tend to press the envelope 1 against the chassis 13.

It will be appreciated that in the arrangement described above the assembled unit formed by the envelope 1, the cup 10, the rubber annulus 11 and the clamp 12 can be clamped directly to the chassis 13 without electrically insulating the clamp 12 from the chassis 13, since the rubber annulus 11 electrically insulates the envelope 1 from the clamp 12 and the cup 10 electrically insulates the envelope 1 from the chassis 13; thus, it will be appreciated that the present invention simplifies the manufacture of electrical apparatus incorporating a semiconductor device of the kind specified in which the envelope is maintained in thermal contact with a cooling member. Moreover, in the arrangement described above the cup 10 could be readily removed from the unit referred to so that if desired the envelope 1 of the transistor could be maintained in direct contact with a cooling member; this may be desired for example in arrangements in which efficient cooling of the collector electrode of the transistor is particularly important.

Considering now the second arrangement with reference to Figures 3 and 4 of the drawings, the second type of transistor also has a copper envelope, generally designated 25, in which is mounted the electrode assembly 26 of the transistor. The envelope 25 of the transistor consists of two parts 27 and 28, each part 27 or 28 being in the form of a circular cylindrical cup of diameter 11.5 millimetres which has formed around its mouth a flange forming part of a circumferential flange 29 formed on the outer surface of the envelope 25; the flange 29 projects for a distance of 0.5 millimetre from the outer curved surface of the envelope 25. A glass bead 30 is sealed through the base of the part 28 and three copper wires 31, 32 and 33 are sealed through the glass bead, the wires 31, 32 and 33 being respectively internally connected to the emitter, base and collector electrodes of the transistor; the collector electrode is in direct contact with the base of the part 28 and is electrically connected to the wire 33 via the part 28. As in the case of the first type of transistor, the flanges of the parts 27 and 28 are cold welded together so that the parts 27 and 28 are coaxial and the envelope 25 is hermetically sealed.

The envelope 25 of the transistor is associated with an electrically insulating anodised aluminium cup 34, a rubber tube 35, an electrically insulating disc 36 of a phenol-formaldehyde resin, a metal clamp generally designated 37, and a cooling member in the form of a metal chassis 38. The cup 34 has a flat base in which is provided a circular hole 39, and the cup 34 fits snugly over the part 28 of the envelope 25 with the wires 31, 32 and 33 passing through the hole 39, with the base of the cup 34 in contact with the base of the part 28, and with the periphery of the open end of the cup 34 in contact with the side wall of the part 28. The clamp 37 is a steel pressing in the form of a circular cylindrical cup the mouth of which is provided with two outwardly projecting lugs 40 and 41 disposed diametrically opposite to each other, the lugs 40 and 41 being respectively provided with two holes 42 which are designed to accommodate the shanks of two bolts 43 and 44. The rubber tube 35 is made of the same kind of synthetic rubber as was used for the annulus 11 in the first arrangement and has an inner diameter of 11 millimetres and a thickness of 0.75 millimetre. The tube 35 is fitted around the flange 29 and the outer curved surface of the envelope 25 so that no part of the tube 35 projects beyond either end of the envelope 25 and so that the cup 34 is held firmly in position relative to the envelope 25 by virtue of the pressure exerted by the tube 35 on the cup 34. The clamp 37 is placed over the envelope 25 with the insulating disc 36 interposed between, and in contact with, the closed end of the clamp 37 and the base of the part 27 of the envelope 25. The rubber tube 35 is trapped between the flange 29 and the inner curved surface of the clamp 37 so that the envelope 25, the cup 34, the tube 35, the disc 36 and the clamp 37 together form one compact unit; the dimensions of the various component parts of this unit are such that the outer surface of the base of the cup 34 is proud of the plane containing the outer surfaces of the lugs 40 and 41 by a distance of 0.13 millimetre.

The base of the part 28 is maintained in good thermal contact with the inner face of the base of the cup 34, and the outer face of the base of the cup 34 is maintained in good thermal contact with the chassis 38, the chassis 38 being designed to conduct heat away from the transistor in operation so as to inhibit overheating of the transistor. The chassis 38 includes two circular holes 45, which correspond in position to the holes 42 in the lugs 40 and 41, and a further hole 46 which corresponds in position to the glass bead 30.

The manner in which the envelope 25 is clamped to the chassis 38 is as follows. The unit referred to above is placed on the chassis 38 with the outer surface of the cup 34 in over-all contact with the chassis 38, and with the wires 31, 32 and 33 passing through the hole 46. The lugs 40 and 41 are then bolted to the chassis 38 by means of the bolts 43 and 44 so that the chassis 38, the cup 34, the envelope 25, the insulating disc 36 and the base of the clamp 37 are pressed firmly together along a direction perpendicular to the chassis 38; it should be understood that the pressing together of these parts is achieved by virtue of the inherent resiliency of the lugs 40 and 41.

It will be appreciated that in the second arrangement described above, the assembled unit formed by the envelope 25, the cup 34, the rubber tube 35, the insulating disc 36 and the clamp 37 can again be clamped directly to the chassis 38 without electrically insulating the clamp 37 from the chassis 38, and the cup 34 can be readily removed from the unit.

If an arrangement in accordance with the present invention is used in relation to a silicon junction transistor, which may be required to operate at a higher temperature than a germanium junction transistor, it is found that silicone rubber is a suitable material for the resilient member trapped between the envelope of the transistor and the clamp, silicone rubber being a more heat resistant material than the synthetic rubber used in the arrangements described above.

It will be appreciated that although the arrangements described above are specifically concerned with transistors, the present invention is equally applicable to other types of semiconductor devices, for example rectifiers.

I claim:

1. In combination: a semiconductor device having a metallic envelope and an electrode assembly enclosed in the envelope; a metallic clamp having a first part adapted to be secured to a cooling member whereby part of the envelope is held in thermal contact with the cooling member; and a member of electrically insulating resilient material which is trapped between part of the envelope and a second part of the clamp whereby the envelope is held by, and electrically insulated from, the clamp.

2. The combination according to claim 1, in which said resilient member is trapped between part of the envelope and said second part of the clamp in such a manner that the resilient member will be compressed and consequently maintain the envelope in good thermal contact with the cooling member when the clamp is secured to the cooling member.

3. The combination according to claim 1, in association with a non-resilient electrically insulating member which is held in contact with the envelope by virtue of said non-resilient member being trapped between the envelope and the resilient member whereby the envelope will be electrically insulated from the cooling member by means of said non-resilient member when the clamp is secured to the cooling member.

4. The combination according to claim 3, in which said non-resilient member is made of anodised aluminium.

5. The combination according to claim 3, in which said non-resilient member is in the form of a cup which fits snugly over part of the envelope.

6. The combination according to claim 1, in which the material of which the resilient member is made is of synthetic rubber having a Shore hardness of about 60.

7. The combination according to claim 6, in which the synthetic rubber is a polymer of 2-chlorbutadiene.

8. The combination according to claim 1, in which the resilient member is in the form of an annulus which is disposed around the envelope.

9. The combination according to claim 1, in which the resilient member is in the form of a sleeve disposed around the envelope.

10. The combination according to claim 1, in which the envelope is provided with a peripheral flange and the clamp is in the form of a tubular member which is disposed around the envelope, the ends of the tubular member being respectively provided with an inwardly projecting flange and at least one outwardly projecting member constituting said first part of the clamp, and the arrangement being such that, when the first part of the clamp is secured to the cooling member, part of the resilient member is trapped between the inwardly projecting flange of the clamp and the flange of the envelope.

11. The combination according to claim 1, in which the clamp is in the form of a cup which is disposed over part of the envelope, the mouth of the cup being provided with at least one outwardly projecting member constituting said first part of the clamp, the device being associated with a further electrically insulating member disposed between the base of the clamp and the adjacent part of the envelope, and the arrangement being such that the envelope is electrically insulated from the clamp, and that, when the first part of the clamp is secured to the cooling member, said further electrically insulating member is trapped between the base of the clamp and the adjacent part of the envelope.

12. In combination: a semiconductor device having a metallic envelope and an electrode assembly enclosed in the envelope; a metallic clamp; a member of electrically insulating resilient material; and a cooling member, a first part of the clamp being secured to the cooling member so that part of the envelope is in thermal contact with the cooling member, and the member of resilient material being trapped between part of the envelope and a second part of the clamp whereby the envelope is held by, and electrically insulated from, the clamp.

13. The combination according to claim 12, in which said resilient member is trapped between part of the envelope and said second part of the clamp in such a manner that the resilient member is compressed and consequently maintains the envelope in good thermal contact with the cooling member.

14. The combination according to claim 12, in association with a non-resilient electrically insulating member which is held in contact with the envelope by virtue of part of said non-resilient member being trapped between the envelope and the resilient member whereby the envelope is electrically insulated from the cooling member by means of said non-resilient member.

15. The combination according to claim 12, in which the envelope is provided with a peripheral flange and the clamp is in the form of a tubular member which is disposed around the envelope, the ends of the tubular member being respectively provided with an inwardly projecting flange and at least one outwardly projecting member constituting said first part of the clamp, and part of the resilient member being trapped between the inwardly projecting flange of the clamp and the flange of the envelope.

16. The combination according to claim 12, in association with a further electrically insulating member, in which the clamp is in the form of a cup which is disposed over part of the envelope, the mouth of the cup being provided with at least one outwardly projecting member constituting said first part of the clamp, and said further electrically insulating member being trapped between the base of the clamp and the adjacent part of the envelope whereby the envelope is electrically insulated from the clamp.

References Cited in the file of this patent

UNITED STATES PATENTS

| | | |
|---|---|---|
| 2,661,447 | Hall | Dec. 1, 1953 |
| 2,825,014 | Willemse | Feb. 25, 1958 |